United States Patent [19]
Methvin

[11] 4,273,107
[45] Jun. 16, 1981

[54] TRACKING SOLAR ENERGY COLLECTOR

[75] Inventor: James Methvin, Harrisburg, Ark.

[73] Assignee: Enertek Energy Engineering Inc., Trumann, Ark.

[21] Appl. No.: 68,171

[22] Filed: Aug. 20, 1979

[51] Int. Cl.³ ............................................... F24J 3/02
[52] U.S. Cl. ................................. 126/445; 126/448; 126/450
[58] Field of Search ............... 126/444, 445, 449, 450, 126/901, 448, 426, 424

[56] References Cited

U.S. PATENT DOCUMENTS

| | | | |
|---|---|---|---|
| 3,987,784 | 10/1976 | Godrick | 126/447 |
| 4,008,708 | 2/1977 | Hagarty | 126/445 |
| 4,015,582 | 4/1977 | Liu | 126/450 |
| 4,026,268 | 5/1977 | Bartos et al. | 126/445 |
| 4,046,135 | 9/1977 | Root et al. | 126/450 |
| 4,048,980 | 9/1977 | Googin | 126/901 |
| 4,080,956 | 3/1978 | Dawley | 126/447 |
| 4,098,331 | 7/1978 | Ford | 126/448 |
| 4,120,286 | 10/1978 | Farber | 126/444 |

FOREIGN PATENT DOCUMENTS 493216  8/1977  Australia .................................. 126/448

*Primary Examiner*—James C. Yeung
*Attorney, Agent, or Firm*—Stephen D. Carver

[57] ABSTRACT

A tracking solar energy collector comprising a plurality of internally defined, spaced-apart channels for containing a working medium to be heated with solar energy. In a preferred form the invention comprises a rigid, generally rectangular frame, a foam insulation layer confined within the frame forming a lower side of the collector, converter means disposed within the frame over the insulation layer for absorbing heat from solar energy, fluid input manifold means disposed within the frame for inputting a working medium into the unit, fluid output manifold means in spaced-apart, substantially parallel relationship with the input manifold means, and a plurality of generally parallel, elongated channels disposed between the converter means and the foam insulative means for conducting fluid between said input manifold means and said output manifold means. In a preferred form of this invention the converter means comprises a carbon silicone elastomer material having an end portion lapped about the major portion of the length of the output manifold.

2 Claims, 4 Drawing Figures

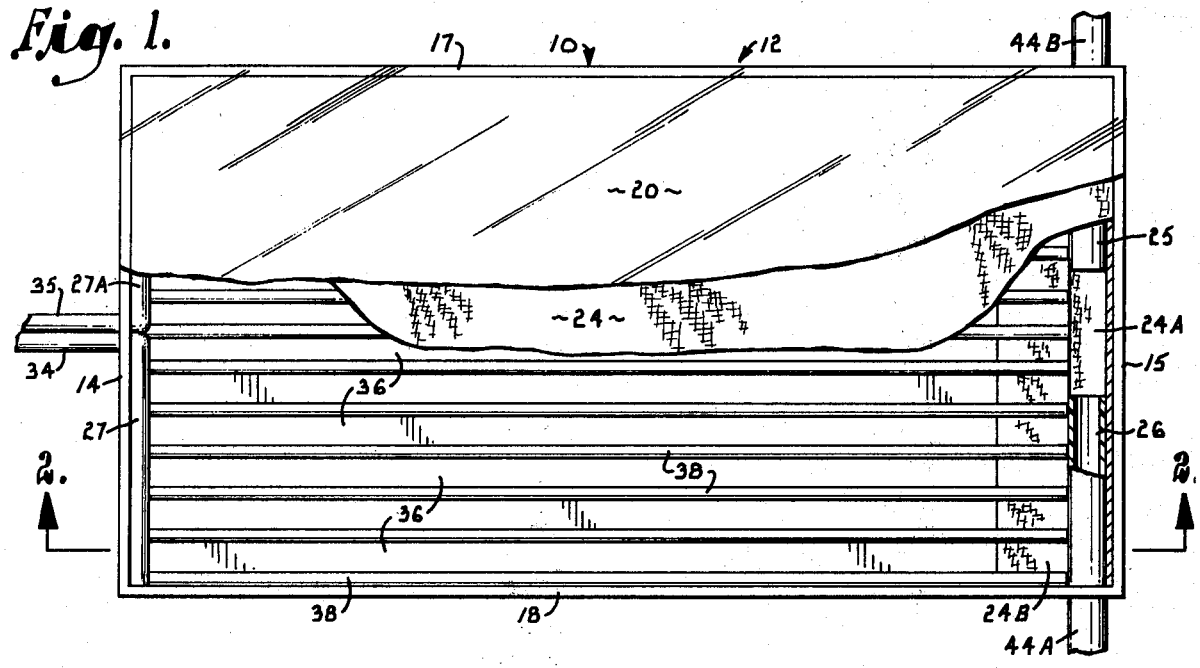
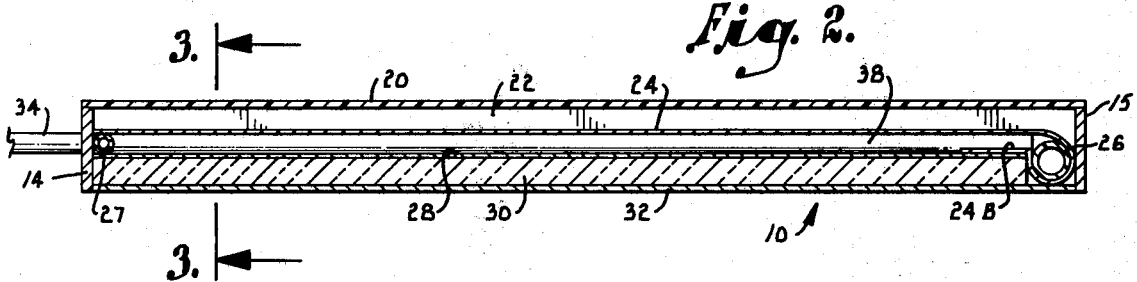
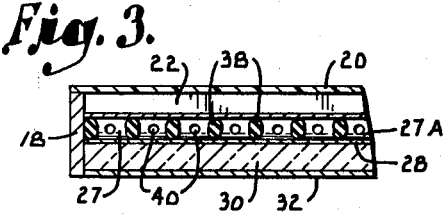
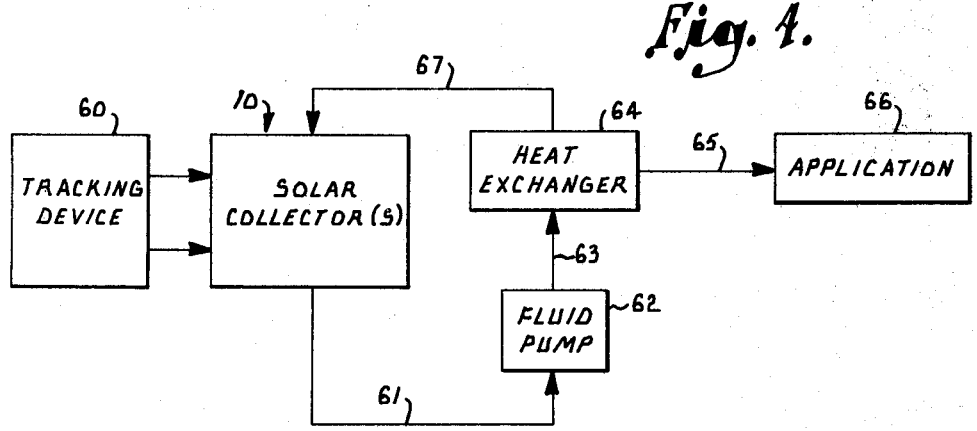

TRACKING SOLAR ENERGY COLLECTOR

BACKGROUND OF THE INVENTION

This invention relates to solar energy collectors. More particularly, the present invention relates to solar energy collector units adapted to be installed or used in conjunction with tracking systems which move continually to follow the sun's apparent movement.

As will be readily appreciated by those skilled in the art, a variety of prior art techniques exist for converting solar energy to thermal energy. A plurality of solar collector units have been previously employed utilizing a wide variety of construction techniques. However, because of the conversion efficiency associated with solar energy devices it will be readily apparent that successful installations will require great numbers of solar collector units. Therefore, in order to maintain the initial installation cost as low as possible, it is mandatory to minimize the construction costs of the units involved. However, working units must nevertheless be strongly resistant to vibratory forces, weather-related forces and the like. Tracking collectors adapted to installed in units which follow the apparent movement of the sun in general must be of more durable construction than stationary collectors. Fluid confined within tracking solar collectors, for example, tends to escape from the units because of the constantly varying angle of deployment.

SUMMARY OF THE INVENTION

The present invention comprises a solar energy collector unit ideally adapted from tracking installations.

The present collector comprises a plurality of separate, cooperative functional layers which are preferably housed within a substantially rigid frame. A plurality of elongated, generally parallel fluid conduction channels are defined within the apparatus for confining a working medium between an input and output manifold.

In a preferred form the collector comprises a lower substantially planar layer of foam insulation, a converter layer for converting solar energy to thermal energy, and an outer or upper glazing layer for minimizing entrance of destructive ultraviolet rays and for preventing thermal radiation losses.

Fluid input manifold means disposed interiorly of the unit communicates with the parallel spaced-apart fluid output manifold through the substantially parallel, elongated channels, which extend between both manifolds substantially perpendicular thereto. The fluid transfer channels are disposed between the converter means and the lower insulation layer, and are preferably defined between rows of elongated, generally rigid glue beads. The glue beads are formed in the manufacturing process by outputting a suitable liquid glue from an output gun upon the insulative layer. The converter layer, preferably comprised of a carbon silicon elastomer material, is formed over the glue beads, and includes one end which is wrapped around the output manifold to confine the fluid exchange medium within the channels.

Thus, an important object of this invention is to provide a tracking solar energy collector unit of extreme durability and reliability which can be produced from readily available materials.

Another object of this invention is to provide a solar energy collector unit of the character described which is ideally adapted for tracking installations. It is an important feature of this invention that the fluid heat exchange medium is confined within a plurality of channels so that the unit may operate properly at a variety of angles and orientations.

A similar object is to provide a tracking solar energy collector of the character described which can be quickly and efficiently manufactured.

These and others objects and advantages of this invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 1 is a top plan view of the invention with parts broken away or shown in section for clarity;

FIG. 2 is a sectional view of the invention taken along line 2—2 in FIG. 1, with parts thereof broken away for clarity;

FIG. 3 is a sectional view taken along line 3—3 of FIG. 2, with parts thereof broken away for clarity; and FIG. 4 is a block diagram illustrating one manner in which the invention may be employed in practice.

DETAILED DESCRIPTION OF THE DRAWINGS

Referring now to the drawings, the present invention comprises a generally rigid, solar collector unit 10 which is ideally adapted for tracking applications. Collector 10 comprises a generally rectangular rigid frame 12 comprised of a plurality of preferably metallic members of generally rectangular cross-section. For example frame 12 comprises end portions 14 and 15, and side portions 17 and 18, all of which may be fastened together through spot welding or the like.

In a preferred form the invention comprises an upper or outer layer 20 comprised of glazing material preferably comprised of a polycarbonate plastic which passes light but prevents thermal energy from escaping after absorption-conversion. Preferably glazing layer 20 may be formed from "Llumar" brand plastic available from Martin Processing, Martinsville, Va.

A converter layer 24 is provided within the apparatus, extending between frame side member 14 and 15 in spaced-apart parallel relationship with respect to glazing layer 20. The converter layer 24 generates heat from sunlight entering the apparatus through the glazing layer 20. Preferably, converter 24 is formed from a woven fiber glass material having a low specific heat and coated with a carbon silicone elastomer substance to facilitate effective heat transfer without re-radiation and consequent thermal losses associated with prior art devices. Preferably, the converter means may be formed from material sold under the trademark OTTO, available from Otto fabrics, Inc., Wichita, Kans., 67128.

As best viewed in FIG. 2, a space 22 defined between glazing 20 and converter means 24 results from their spaced-apart relationship and may retain heated air. Alternatively, a fiber glass fill substance may be inserted within spaced 22 to form a damper system for minimizing convective thermal losses. The optional convection damper system may be formed from a loosely spun fiber glass material such as T-C-Glass brand filter media available from Koch Inc.

The lowermost layer of the unit is comprised of a foam insulation layer 30, of generally planar dimensions which is confined within frame 12 between walls 14 and 15. Preferably the foam insulation layer 30 is provided with a pair of preferably metallic foil layers 28,32 formed on opposite sides thereof. The function of layer 30 is to insulate the unit and to prevent unwanted heat loss. It will be apparent that the dimensions of the foam insulation layer 30 are such that a small cavity may be formed at the lower right side (as viewed in FIG. 2) thereof, for placement of an output manifold.

Importantly, a plurality of generally rectangular, elongated fluid conductive channels 36 extend in spaced-apart, parallel relationship along the length of the converter 10. These fluid conduction channels are defined between rigid, elongated members 38, which are preferably formed from a liquid glue dispensed in the form of rows during the manufacturing process from a gun dispensor. As best viewed in FIG. 3, these "glue beads" 38 are of generally oval cross section, and are sandwiched between converter 24 and the upper metallic layer 28 of foam layer 30.

A heat exchange medium or fluid is inputted into the collector unit through a pair of input pipes 34 and 35, which are interconnected with an input manifold comprising opposite segments 27, 27A. As best viewed in FIG. 3, the input manifold section 27, 27A are provided with a plurality of orifices 40 which are lined up between the glue beads 38 so that a fluid medium (such as water) may be inputted directly into the conduction channels 36. The output manifold comprises pipes 25, 26 which are parallel to the input manifold and located at an opposite side of the tracking unit. If will be apparent that the output manifold communicates with an external application through pipes 44A, 44B. Pipes 25, 26 are separated by a space 24A, which receives fluid from the conduction channels 36 for subsequent delivery to the application 66 (FIG. 4). It is important to note that the converter layer 24 includes an end portion 24B thereof which is lapped around the output manifold (FIG. 2) to aid in ease of construction, while at the same time confining a fluid exchange medium within channels 36. In this fashion rapid construction of the unit 10 may be achieved.

With reference now to FIG. 4, one or more solar collectors 10 constructed in accordance with the teachings of this invention are adapted to be physically moved with a tracking device 60. The tracking device may comprise a variety of conventional units adapted to follow the apparent movement of the sun. The fluid exchange medium outputted from the solar collector output manifold may be received within conduit 61, and forced into heat exchanger 64 by a fluid pump 62, which communicates with the heat exchanger 64 through conduit 63. Fluid is then returned from the heat exchanger 64 via conduit 65. It will be readily apparent that the solar collector thus described may consequently be used with a wide variety of tracking applications.

Thus, I have described a new tracking solar energy collector capable of being readily constructed from available materials, and which is ideally adapted for tracking installations, in that the fluid medium is carefully confined within a plurality of fluid exchange channels.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An internally manifolded tracking solar collector comprising:
   rigid, generally rectangular frame means adapted to be coupled to a conventional, external solar tracking device;
   substantially planar foam insulative means disposed within said frame means and forming a bottom of said collector;
   converter means of substantially planar dimensions formed from carbon silicone sheet material and disposed within said frame means for generating heat from solar energy;
   tubular fluid input manifold means disposed interiorly of said collector at one end thereof for inputting heat exchange fluid into said collector;
   tubular fluid output manifold means disposed interiorly of said coverter at an opposite end thereof in spaced-apart, substantially parallel relationship with respect to said fluid input manifold means for outputting warmed fluid from said collector to an application;
   a plurality of generally parallel elongated, fluid conduction channels disposed within said frame means between said foam insulative means and said converter means for conducting a heat exchange fluid between said input manifold means and said output manifold means, said channels defined between a plurality of rigid, parallel, elongated glue beads extending longitudinally within said frame in perpendicular relation with respect to said input manifold means and said output manifold means, said glue beads operable to secure said converter means and said foam insulative means together;
   an end portion of said converter means lapped about a major portion of the circumference of said tubular output manifold means whereby to sealably confine fluid within said channels, the terminal edge of said end portion being secured by said glue beads to said bottom foam insulative means; and,
   glazing means forming a top of said collector disposed upon said frame above said converter means for minimizing escape of energy.

2. The combination as defined in claim 1 wherein said solar collector comprises internal filter means positioned between said converter means and said foam insulative means.

* * * * *